US011488425B2

(12) United States Patent
Übelacker

(10) Patent No.: US 11,488,425 B2
(45) Date of Patent: Nov. 1, 2022

(54) SYSTEM FOR THE REPRESENTATION OF VIBRATIONS

(71) Applicant: GRAMMER AG, Amberg (DE)

(72) Inventor: Roland Übelacker, Pfreimd (DE)

(73) Assignee: GRAMMER AG, Ursensollen (DE)

( * ) Notice: Subject to any disclaimer, the term of this patent is extended or adjusted under 35 U.S.C. 154(b) by 756 days.

(21) Appl. No.: 16/514,073

(22) Filed: Jul. 17, 2019

(65) Prior Publication Data

US 2020/0027288 A1 Jan. 23, 2020

(30) Foreign Application Priority Data

Jul. 18, 2018 (DE) .......................... 102018117322.9

(51) Int. Cl.
*G07C 5/08* (2006.01)
*G01H 1/14* (2006.01)
(Continued)

(52) U.S. Cl.
CPC ........... *G07C 5/0808* (2013.01); *B60G 17/00* (2013.01); *B60N 2/501* (2013.01); *F16F 9/3292* (2013.01);
(Continued)

(58) Field of Classification Search
CPC ...... G07C 5/0808; B60G 17/00; B60N 2/501; B60N 2/505; B60N 2002/0272;
(Continued)

(56) References Cited

U.S. PATENT DOCUMENTS 5,732,370 A 3/1998 Boyle et al.
5,748,473 A * 5/1998 Breed .................. G01S 7/4802
297/410
(Continued)

FOREIGN PATENT DOCUMENTS

CN 1933780 3/2007
CN 106470871 3/2017
(Continued)

OTHER PUBLICATIONS

Official Action for German Patent Application No. 102018117322.9, dated Mar. 13, 2019, 3 pages.
(Continued)

*Primary Examiner* — Richard M Camby
(74) *Attorney, Agent, or Firm* — Sheridan Ross P.C.

(57) ABSTRACT

The invention relates to a system for representing vibrations for a vehicle, comprising a vehicle seat with an upper part and a lower part, which are mounted movably relative to each other by means of a vibration device, wherein at least a first sensor, which is adapted to detect at least one first characteristic of a first acceleration of the upper part relative to the lower part, is arranged on the upper part, and wherein at least one second sensor, which is adapted to detect at least one second characteristic of a second acceleration of the lower part relative to a subsurface of the vehicle, is arranged on the lower part, wherein a display device is arranged with a first section and a second section, in each case exhibiting a complete division into at least two, preferably three
(Continued)

segments, wherein the size ratios of the at least two segments to one another can be updated depending on a current value of the at least one first characteristic or the at least one second characteristic.

20 Claims, 6 Drawing Sheets

(51) Int. Cl.
    *G01H 1/16*           (2006.01)
    *F16F 9/32*           (2006.01)
    *B60G 17/00*         (2006.01)
    *B60N 2/50*          (2006.01)
    *F16F 15/00*         (2006.01)
    *F16F 15/02*         (2006.01)
    *B60W 50/14*        (2020.01)

(52) U.S. Cl.
    CPC ............ *F16F 15/002* (2013.01); *F16F 15/02* (2013.01); *G01H 1/14* (2013.01); *G01H 1/16* (2013.01); *B60W 2050/146* (2013.01); *F16F 2230/08* (2013.01)

(58) Field of Classification Search
    CPC ... B60N 2/90; B60N 2002/981; F16F 9/3292; F16F 15/002; F16F 15/02; F16F 2230/08; G01H 1/14; G01H 1/16; G01H 1/04; G01H 17/00; B60W 2050/146
    See application file for complete search history.

(56) References Cited

U.S. PATENT DOCUMENTS

| | | | |
|---|---|---|---|
| 5,822,707 A | * | 10/1998 | Breed ............... G01S 7/4802 296/65.18 |
| 2003/0009270 A1 | * | 1/2003 | Breed ............ G06K 7/10178 701/32.4 |
| 2007/0271014 A1 | * | 11/2007 | Breed ............... B60N 2/2863 701/31.9 |
| 2008/0051946 A1 | * | 2/2008 | Breed ............... B60R 21/233 701/538 |
| 2012/0186922 A1 | | 7/2012 | Battlogg et al. |

FOREIGN PATENT DOCUMENTS

| | | |
|---|---|---|
| CN | 107415788 | 12/2017 |
| DE | 4308559 | 9/1994 |
| DE | 102004057679 | 6/2006 |
| DE | 102008058409 | 7/2009 |
| EP | 1661796 | 5/2006 |
| EP | 1752747 | 2/2007 |
| EP | 2048008 | 4/2009 |
| JP | 2002-286743 | 10/2002 |

OTHER PUBLICATIONS

Official Action with English Translation for China Patent Application No. 201910652654.5, dated Jul. 2, 2021, 11 pages.
Extended Search Report for European Patent Application No. 19185449.6, dated Jan. 10, 2020, 3 pages.

* cited by examiner

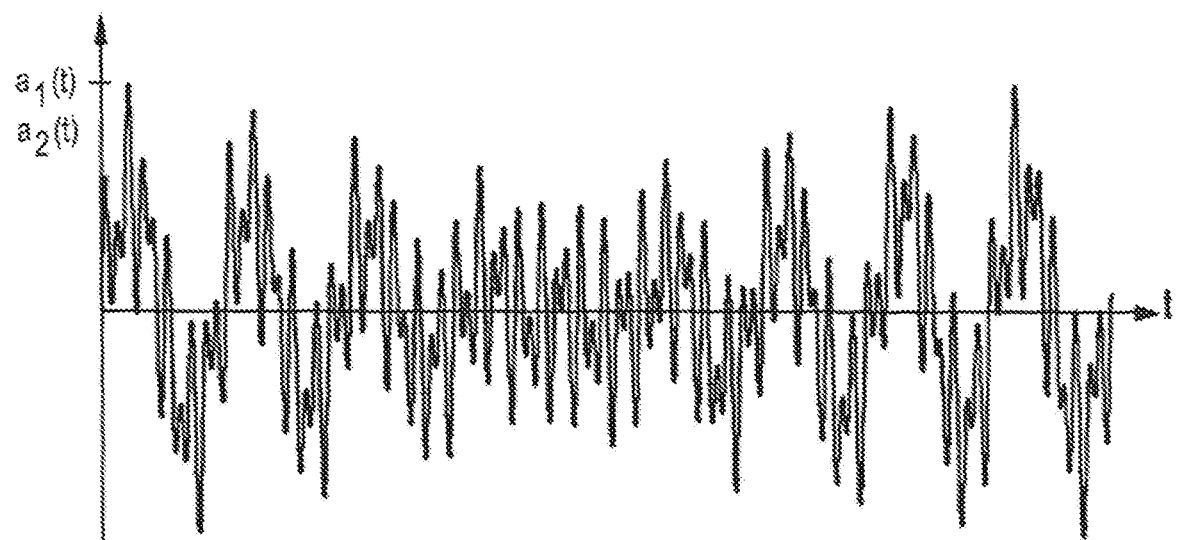

SYSTEM FOR THE REPRESENTATION OF VIBRATIONS

CROSS-REFERENCE TO RELATED APPLICATION

This application claims the benefit of German Patent Application No. DE 10 2018 117 322.9 filed Jul. 18, 2018, the entire disclosure of which is incorporated herein by reference.

FIELD

The invention relates to a system for representing vibrations for a vehicle, comprising a vehicle seat with an upper part and a lower part, which are mounted movably relative to each other by means of a vibration device, wherein at least one first sensor, which is adapted to detect at least one first characteristic of a first acceleration of the upper part relative to the lower part, is arranged on the upper part, and wherein at least one second sensor, which is adapted to detect at least one second characteristic of a second acceleration of the lower part relative to a subsurface of the vehicle, is arranged on the lower part.

BACKGROUND

From the prior art, different approaches are known to process vibrations which are introduced into a vehicle. High-priced solutions include fully automatic vibration damping systems that detect and reduce vibrations without driver intervention. Low-priced solutions dispense with elaborate vibration damping systems.

SUMMARY

The object of the present invention is therefore to develop an intermediate solution, which provides the approach to automatically detect the vibrations introduced, on the one hand, but on the other hand, to reduce them by individual intervention of the driver. Such a semi-automatic solution would, on the one hand, be economically more interesting than the fully automatic solutions and would, on the other hand, offer the driver the possibility of adjusting the vibration regulation according to his individual wishes. To ensure this, a system is to be developed which is able to provide the driver with at least one qualitative finding about the induced vibrations as a basis for the decision.

The object of the present invention is achieved by a system for representing vibrations for a vehicle, comprising a vehicle seat with an upper part and a lower part, which are mounted movably relative to one another by means of a vibration device, wherein at least one first sensor, which is formed to detect at least one first characteristic of a first acceleration of the upper part relative to the lower part, is arranged on the upper part, and wherein at least one second sensor, which is adapted to detect at least one second characteristic of a second acceleration of the lower part relative to a subsurface of the vehicle, is arranged on the lower part, wherein a display device is provided with a first section and a second section, each exhibiting a complete division into at least two, preferably three segments, wherein the size ratios in relation to one another of the at least two segments can be updated depending on a current value of the at least one first characteristic or the at least one second characteristic.

For the purposes of the present invention, the expression "representation of vibrations" is understood in particular in such a way that the real values of the vibrations occurring are quantitatively transferable to the perception of the driver. Thus, a quick detection of the vibration state by the driver is possible.

On the one hand, which vibrations are introduced into the vehicle via the ground is therefore displayed to the driver by means of the display device, and on the other hand, which vibrations the upper part of the vehicle seat performs. This gives the driver a finding about which vibrations, if any, arrive at the seat. By dividing the sections of the display device into individual segments and by updating the size ratios of the segments, it is possible for the driver, by looking at the display device, to obtain a quantitative statement about the current vibration state of the vehicle and the seat.

Vibrations are generally characterized by several parameters. The period duration is, for example, the time that elapses while the vibratory system undergoes exactly one vibration period, after which it is again in the same vibration state. For example, therefore, the acceleration is recorded over time, thus the vibratory system exhibits the same acceleration value after a period of vibration as at the beginning of the period of vibration. Similarly, it would be possible to record the deflection or velocity of the vibration over time. The present invention can therefore also be directed to a deflection or a velocity of the upper part relative to the lower part and/or to a deflection or a velocity of the lower part relative to a subsurface.

It is preferable that the display device is continuously updatable after a defined time interval. Preferably, this time interval is less than 1 second, more preferably less than 500 ms, most preferably less than 200 ms.

In order to pass on the signals of the sensors without loss, it is preferred that the at least one first sensor is configured to transmit first signals, which are based on the at least one first parameter, to a higher-order control device, and that the at least one second sensor is designed to transmit second signals, which are based on the at least one second characteristic, to the control device, wherein the control device is adapted to transmit third and fourth signals from the first and/or the second signals to the display device.

For the purposes of the present invention, the term "complete division" is understood to mean that the first and the second section have only the segments which can be updated in terms of their size but no further elements such as, for example, cavities or other intermediate elements. Thus, in other words, the at least two segments of the first section and of the second section respectively completely fill the section assigned to them or together form 100% of the extent of the first or the second section. In this case, the individual segments may preferably have a relative size of 0 to 93.3% of the entire first or second section.

Preferably, the number of segments can also be updated. Thus, it is possible for the first and second sections to represent a first number of segments (e.g., two) and, after an updating step, represent a second number of segments different from the first number of segments (e.g., three).

Preferably, the at least two segments are distinguishable from each other, at least visually by the human eye. This can be ensured, for example, by the at least two segments having a different design in the form of different colours and/or patterns (for example hatchings or dots). It is conceivable that in each case one of the segments of the first section has an identical design to each of the segments of the second section. Such segments are referred to below as twin segments. Preferably, several or all segments of the first section have a twin segment in the second section.

Preferably, the first and/or the second section has exactly two in each case or has exactly three segments in each case. For example, it is conceivable that a first segment of the first section is coloured red, a second segment of the first section is coloured yellow, and a third segment of the first section is coloured green. Furthermore, it is conceivable that a first segment of the second section is coloured green, a second segment of the second section is coloured yellow, and a third segment of the second section is coloured red.

It has proven useful in practice that the first and the second section are formed directly adjacent to each other or are spaced apart from each other. It is preferred that adjacent sections of the first and second sections have an identical design.

It is preferred that each specific size ratio of the segments of the first and/or the second section is based on exactly one specific current value of the at least one first characteristic or the at least one second characteristic. The same applies vice versa.

It is advantageous if in each case a value range for the at least one first characteristic and/or the at least one second characteristic is defined in advance, which can be displayed by means of the display device. For example, the predefined range of values includes vibrations which are considered to be uncritical for the human body and, at the same time, vibrations which are considered to be particularly relevant to the human body, for example because they represent resonance frequencies of certain body parts.

Furthermore, it is advantageous that each of the segments is assigned to a specific range of vibrations. For example, a first one of the segments represents a low vibration range, a second one of the segments represents a middle vibration range, and a third of the segments represents a high vibration range. Depending on the current value of the characteristic, it is thus preferable that one segment of the first and/or the second section outweighs the remaining segments in terms of its size.

Thus, at least one can estimate on the display device and more precisely with the currently displayed size ratio of the segments whether the current value of the at least one first characteristic or the at least one second characteristic represents a high, medium or low value from the range of values.

In order to make it as easy as possible for the driver to estimate the amount of the current value of the first or the second characteristic on the basis of the size relationships of the segments of the first and/or the second section, an illustration is proposed as follows.

The idea is based on the idea of providing a virtual circular disc whose outer circumferential surface is designed in each case with a first portion having a first colour or a first pattern, and with a second portion having a second colour or a second pattern, up to an n-th portion, which is configured with an n-th colour or an n-th pattern. The portions are each formed continuously in the radial direction of the outer circumferential surface. Preferably, each portion is arranged adjacent to two further portions. For example, the portions correspond to thirds, so that n is equal to 3; in this case, each portion is preferably arranged adjacent to each further portion.

A virtual observer stands laterally next to the circular disc and thus directs his gaze to one half of the outer circumferential surface of the circular disc; the other half of the outer circumferential surface of the circular disc is not visible to him. The position of the virtual observer is designed so that his viewing direction is perpendicular to a central axis of the circular disc and is arranged in such a way that it intersects this. Thus, for the virtual observer, the colour or pattern distribution of the outer circumferential surface is the same as the projection thereof onto a flat surface parallel to the central axis of the circle. Depending on the angular position of the circular disc (with respect to a rotation of the circular disc around its own central axis), the position of the portions with respect to the position of the observer changes, so that he perceives a changed size ratio of the segments.

It is proposed below to use the representation of the outer circumferential surface according to the projection for the representation of the segments of the first and the second sections of the display device.

Accordingly, it is advantageous if a size of one of the segments of the first and/or second section of the display device is configured linearly to a size of a projection of a portion of a virtual circular disc assigned to the respective segment onto a surface parallel to a central axis of the virtual circular disc. Preferably, the circular disc is designed to be rotatable about its central axis, more preferably at least or exclusively in a range from 0 to 180°.

Preferably, a number of the portions of the circular disc corresponds to a number of the segments of the respective section, wherein the portions are preferably equal in each case and/or the circular disc is preferably completely divided into the portions.

However, it is also conceivable here that the portions are not the same size. For example, one portion is designed larger than the remaining portions. This makes sense if, for example, a critical range of a vibration should be recognizable to the driver more quickly above a certain value.

The above explanations apply advantageously to any conceivable form of the first and/or the second section (bar, circle, semicircle), as described in more detail below.

After looking at the display device, the driver can, for example, manually control actuators. Examples of such actuators are valves for ventilation of tyres or an air spring (whereby, for example, an adjustment of the spring characteristic is possible) or devices for changing parameters of absorbers or springs. The actuators preferably have functions and/or adjustment options assigned to them which have no effects on the vehicle seat, but only on the rest of the vehicle. However, it is also conceivable that the actuators have functions and/or adjustment options assigned to them which have effects on the vehicle seat, on the vehicle and/or other components arranged on the vehicle.

In this case, it is advantageous if the at least one first characteristic and the at least one second characteristic are selected from a group comprising an amplitude, a frequency, a period duration, an actual value, a summand and an average value over a defined period of the first or the second acceleration.

In this case, for the summand and/or the average value over a defined period of time, for example, this value is calculated on the basis of a current time. For example, the summand and/or the average value is calculated taking into account the values of a time interval immediately before the current time. For example, the duration of the time interval is 8 h, 1 h, 1 min, 1 s, 100 ms or 10 ms. The summand and the mean value therefore in each case also represent a current value of the characteristics.

This summand advantageously represents a sum (or an integral) of the values of the amplitude, the frequency, the period duration and/or the actual value of the first or the second acceleration detected in the respective time interval.

The average value advantageously represents an average of the values of the amplitude, the frequency, the period duration and/or the actual value of the first or the second acceleration detected in the respective time interval.

Advantageously, it is possible for the driver to switch between different parameters, for example to display at one time the current value of the vibration period or the current value of the amplitude of the acceleration of the vibration and at another time the average value of the corresponding amplitudes of the last hour. At the end of the working day (after 8 h), for example, a sum of the actual values of the accelerations that have occurred is interesting.

Thus, it is advantageous if the display device and in particular its first and/or second section can be switched with respect to a representation between different types of characteristics.

In addition, it is conceivable that the first section and/or the second section of the display device are each designed in the form of a bar, which is subdivided into the at least two segments along a longitudinal extent.

Alternatively, it is conceivable that the first section and/or the second section are configured in the form of a circle or a semicircle, which exhibits a subdivision into the at least three segments along a radial direction. This circle or semicircle is thus part of the actually visible display device, while the above-mentioned virtual circular disc serves only as an explanation of the basic consideration based on which the actual size ratios of the segments can be calculated.

In order to give the driver the possibility of being able to set the actuators as efficiently as possible on the basis of the data or findings from previous trips, it is preferred that parameters of actuators of the vehicle are adjustable by means of the control device, wherein the parameters of the actuators and/or data based on the first, second, third and/or fourth signals is transferable to a processing unit and to a storage unit by means of the control device.

BRIEF DESCRIPTION OF THE DRAWINGS

Further advantages, objects and properties of the present invention are described with reference to the accompanying drawings and the following description, in which a vehicle seat with an adjusting device according to the invention is shown and described by way of example. In the drawings.

DETAILED DESCRIPTION

Figure 1:
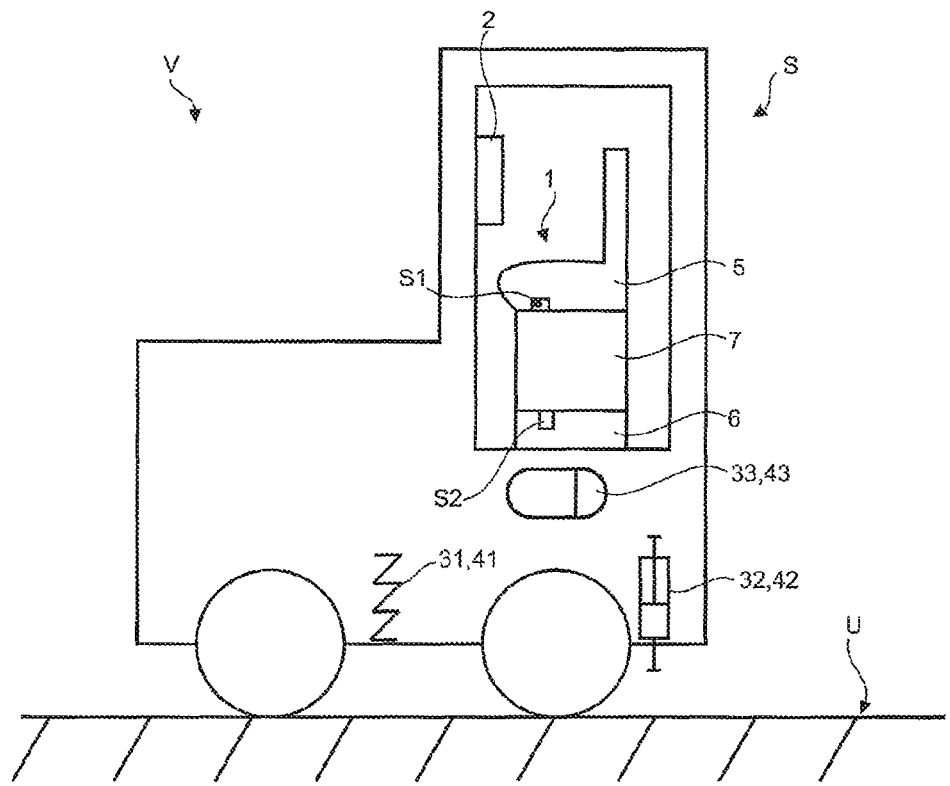
FIG. 1 shows a schematic representation of a system according to the invention.
Figure 5A:
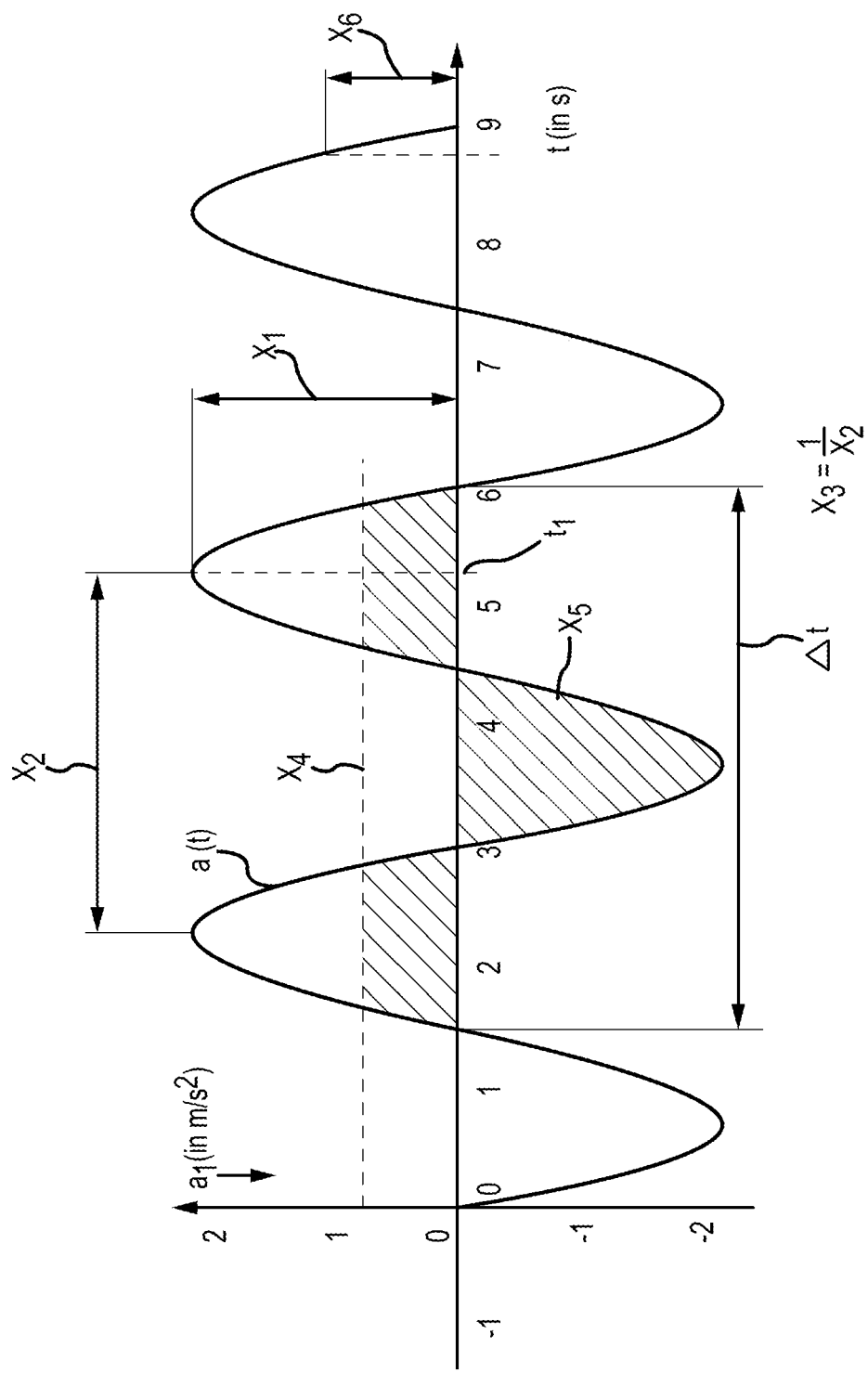
FIG. 5a, b show a representation of different types of vibration and their characteristics.

According to FIG. 1, an embodiment of a system S according to the invention is shown for representing vibrations of a vehicle V. This system S comprises a vehicle seat 1 with an upper part 5 and a lower part 6, which are mounted movably relative to one another by means of a vibration device 7, wherein a first sensor S1, which is designed to detect at least one first parameter x1, . . . , x6 (see FIG. 5a, 5b) of a first acceleration of the upper part 5 relative to the lower part 6, is arranged on the upper part 5. In the present case, a second sensor S2, which is designed to detect at least one second parameter y1, . . . , y6 (see FIG. 5b) of a second acceleration of the lower part 6 relative to a subsurface U of the vehicle V, is arranged on the lower part 6.

Details of the vibration device 7 and any further vibration, suspension or damping devices of the vehicle seat 1 and the rest of the vehicle V are not shown.

A display device 2 is also shown in FIG. 1. Details and embodiments of this display device 2 will be described in more detail according to FIG. 4a-c. Based on this display device 2, a driver, not shown, receives a finding about a current value of a first acceleration a1 (see FIG. 5b) of a vibration of the upper part 5 relative to the lower part 6 and also about a current value of a second acceleration a2 (see FIG. 5b) of a vibration of the lower part 5 relative to the subsurface U of the vehicle V.

Figure 2:
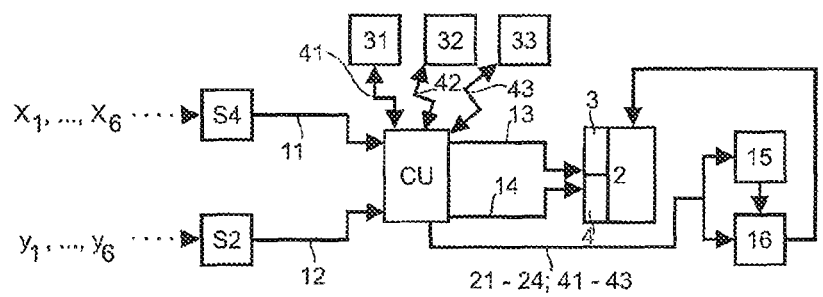
FIG. 2 shows a schematic representation of a circuit diagram of the system according to the invention from FIG. 1.
Figure 3A:
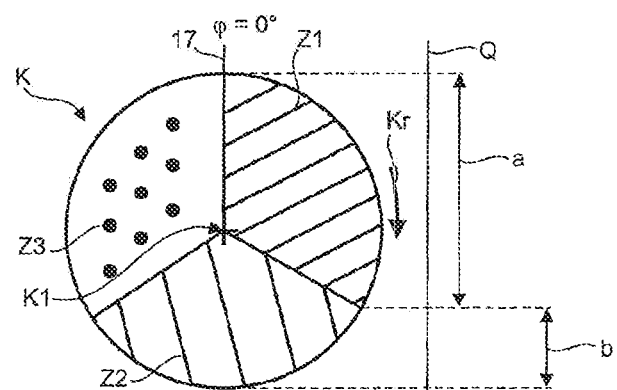
FIG. 3a-d show representations of different angular positions of a virtual circular disc.
Figure 3B:
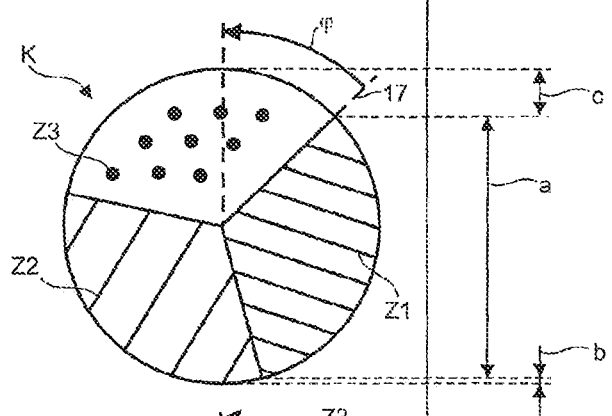
Figure 3C:
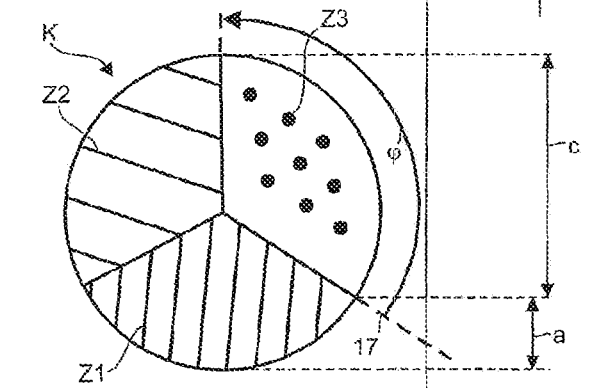
Figure 3D:
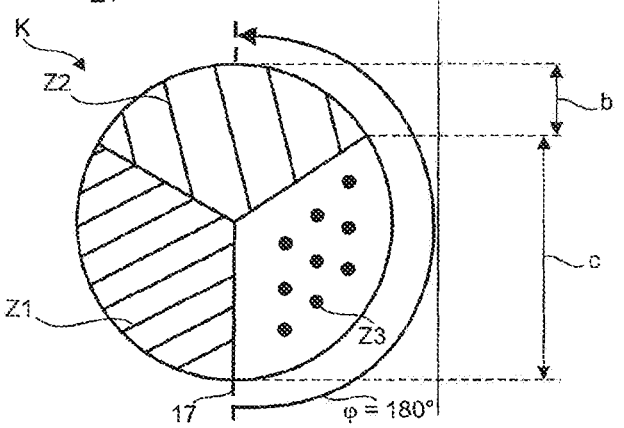

According to FIG. 2, a schematic representation of a circuit diagram of the system S according to the invention from FIG. 1 is shown. The at least one first sensor S1 is accordingly designed to transmit the first signals 11 which are based on the at least one first characteristic x1, . . . , x6, to a master control device CU. In addition, the at least one second sensor S2 is designed to transmit second signals 12, which are based on the at least one second characteristic y1, . . . , y6, to the control device CU.

The control device CU, in turn, is configured to send third 13 and fourth signals 14 to the display device 2 starting from the first 11 and/or the second signals 12. By way of example, the first signals 11 form the basis for the third signals 13 and the second signals 12 form the basis for the fourth signals 14. For example, the third signals 13 are used to update the representation of a first section 3 of the display device 2. For example, the fourth signals 14 are used to update the representation of a second section 4 of the display device 2.

The present system S provides that parameters 41, 42, 43 of actuators 31, 32, 33 of the vehicle V are adjustable by means of the control device CU, wherein, by means of the control device CU, the parameters 41, 42, 43 of the actuators 31, 32, 33 and/or data 21, 22, 23, 24, which are based on the first, second, third and/or fourth signals 11, 12, 13, 14, can be transferred to a processing unit 15 and to a memory unit 16.

Thus, based on the information which he obtains with a view of the display device 2, the driver can adapt the parameters 41, 42, 43 of the available actuators 31, 32, 33. At the same time, the system S is able to merge, process and store data. This makes it possible for the driver to subsequently retrieve in which way which parameters 41, 42, 43 of which actuators 31, 32, 33 have been changed on the basis of which first 11 and/or second signals 12 (by transmitting the third 13 and fourth signals 14). Furthermore, by looking at the stored values, the driver recognizes whether these changes were sensible or not and, for example, have led to the desired reduction of the first acceleration, for example with respect to the amplitude (x1, see FIG. 5a) of the upper part 5 relative to the lower part 6.

An example of a mathematical basis with reference to FIGS. 3a-d shows how the size ratios of the segments 3a, 3b, 3c, 4a, 4b, 4c of the first 3 and/or second section 4 of the display device 2 which are actually shown on the display device 2, may be dependent on the underlying current value of at least one first characteristic x1, . . . , x6 or the at least one second characteristic y1, . . . , y6. It should be noted that the virtual circular disc K is not objectively formed; rather, the following explanation will be made more clearly on the basis of the virtual circular disc K and its virtual rotation about its central axis K1 by the angle cp.

A virtual circular disc K is shown here which is divided completely along a radial direction Kr, i.e. without any remainder, into three equal portions Z1, Z2, Z3 in this case, of 120° each.

The number (in the present case three) of the portions Z1, Z2, Z3 of the circular disc K corresponds to a maximum number of the segments $3a$, $3b$, $3c$; $4a$, $4b$, $4c$ of the respective section 3; 4. Such sections 3; 4 with three segments $3a$, $3b$, $3c$; $4a$, $4b$, $4c$ in each case are illustrated for example with reference to the embodiments in FIG. $4a$-$c$.

Also shown is a surface Q, which is configured parallelly to a central axis K1 of the virtual circular disc K.

In this example, a size of one of the segments $3a$, $3b$, $3c$; $4a$, $4b$, $4c$ of the first 3 and/or second section 4 of the display device 2 is linear to a size of a projection a, b, c of the portion Z1, Z2, Z3 of the virtual circular disc K on the surface Q assigned to the respective segment $3a$, $3b$, $3c$; $4a$, $4b$, $4c$. In the present case, the projection thus corresponds to a line with a specific length a, b or c.

It is conceivable, for example, that the first portion Z1 is assigned to the first segment $3a$, the second portion Z2 to the second segment $3b$ and the third portion Z3 to the third segment $3c$ of the first section 3. Of course, the representation of the second section 4 can be made according to an analogous system.

A position of a dividing line 17 between the first Z1 and the third portion Z3 serves as an indication of a value of an angle φ by which the circle K is rotated relative to a zero position (see FIG. $3a$) about its central axis K1. This dividing line 17 is shown in FIG. $3a$ at the 12 o'clock position; thus, the angle φ has a value of 0. According to FIG. $3d$, the dividing line 17 is at the 6 o'clock position; thus, the angle φ has a value of 180°. The representations of FIGS. $3b$ and $3c$ respectively show positions for values of φ between 0 and 180°. The positions according to FIGS. $3a$ and $3d$ preferably represent end positions of the illustrated rotational movement of the circular disc K, so that the present circular disc K is rotatable exclusively in a range from 0 to 180°.

In the present case, for example, this angle φ is linearly related to an x1 of the at least one first characteristic x1, . . . , x6 of a first acceleration of the upper part 5 relative to the lower part 6; for example, for φ:

$$\varphi = mx1 + t'$$

wherein m and t' are the known parameters by means of which a straight line can be described.

Thus: If x1 changes, the angle φ and thus the position of the dividing line 17 between the first Z1 and the third component Z3 also change. Also, as shown in FIGS. $3a$ to $3d$, the size of the projections a, b, c of the portions Z1, Z2, Z3 of the virtual circular disc K on the surface Q change. While, according to FIG. $3b$, all three portions Z1, Z2, Z3 are projected onto the surface Q by means of the projections a, b, c, according to FIGS. $3a$, $3c$ and $3d$, a respective portion (Z3 in FIG. $3a$, Z2 in FIG. $3c$ and Z1 in FIG. $3d$) is such that it is not shown on the surface Q.

Transferred to the display device 2, this means: If a current value of the characteristic x1 exists according to FIG. $3b$, three segments $3a$, $3b$, $3c$ are shown on the first section 3 in the size ratio of a:b:c according to FIG. $3b$. If a current value of the characteristic x1 exists according to FIG. $3a$, only two segments $3a$, $3b$ are shown on the first section 3 in the size ratio of a:b according to FIG. $3a$. If a current value of the characteristic x1 exists according to FIG. $3c$, only two segments $3a$, $3c$ are shown on the first section 3 in the size ratio of a:c according to FIG. $3c$. If a current value of the characteristic x1 exists according to FIG. $3d$, only two segments $3b$, $3c$ are shown on the first section 3 in the size ratio of b:c according to FIG. $3d$.

According to the underlying system, therefore, the size ratios of the three segments $3a$, $3b$ and $3c$ of the first section 3 of the display device 2 are adapted to the size ratios of the projections a, b and c of the portions Z1, Z2, Z3 of the virtual circular disc K on the surface Q. Therefore, if the vehicle seat 1 vibrates strongly, a current value of the parameter x1, which represents, for example, the amplitude x1 of the acceleration a1 of the first vibration, is high. With respect to the example of the circular disc K, this corresponds to a virtual rotation of the circular disc K about the axis K1 about an angle φ which is large in relation to the basic value range of $0 \leq \varphi \leq 180°$; for example, in this case φ=170°. This has the consequence that the size of the projection c, which is assigned to the third portion S3, is higher than the sizes of the projections a and b, which are associated with the first portion S1 and the second portion S2.

Since the third portion Z3 is assigned to the third segment $3c$ of the first section 3 of the display device and in this case is linearly related to it, wherein the same applies analogously to the first portion Z1 and second portion Z2 and the first segment $3a$ and second segment $3b$, the size ratio of the three segments $3a$, $3b$ and $3c$ to each other likewise changes linearly on the first portion 3 of the display device 2 to the currently prevailing size ratios of the projections a, b and c. The driver would thus see, for example, that on the first section 3 of the display device 2, the third segment $3c$ clearly outweighs the other segments $3a$ and $3b$ in terms of its size.

By a corresponding colour or patterning of the segments $3a$, $3b$, $3c$ (for example, green for the first segment $3a$, yellow for the second segment $3b$, and red for the third segment $3c$), the recognition can be accelerated again: the driver sees, for example, that the first display device 3 is currently dominated by the (for example, red-coloured) third segment $3c$, and can thus directly infer a high current value of the characteristic x1 and take appropriate countermeasures by adapting the parameters 41, 42, 43 of the actuators 31, 32, 33.

Using the example of a harmonic vibration, which can thus be described by a sinusoidal function, according to FIG. $5a$, it should once again be clarified which parameters of a vibration may be relevant in the present case. In this example, the parameters x1, . . . , x6 of the first acceleration a1 are shown.

A graph a(t) representing acceleration a1 versus time t is shown. The deflection a(t) indicates the current value (see highlighted example x6), and the amplitude x1 indicates the maximum possible value of the quantity a(t). By way of example, the graph shows the amplitude x1 of the acceleration a (in this example, x1 is marked at time t1). The period duration x2 between extreme values of the graph a(t) is also marked. This results in the frequency x3 of the oscillation as the reciprocal of x2.

The quantity x2 is the time that elapses while the vibratory system (consisting of the upper part and lower part) undergoes exactly one vibration period, after which it is again in the same vibration state. Thus, for example, the vibratory system exhibits the same acceleration value after one vibration period as at the beginning of the vibration period.

A time interval Δt and two associated quantities x4 and x5 are also marked. In this case, x4 represents the average value of the acceleration a(t) within the time interval Δt. The variable x5 in turn marks the area (positive and negative) below the function a(t) from the start of the time interval Δt to its end.

The person skilled in the art knows, of course, that in reality the described vibrations a1 and a2 are generally not harmonic, but represent a superposition of partial vibrations and thus must be referred to as unharmonic vibrations (see FIG. 5b as an example for a1(t) or a2(t)). The frequencies of the partial vibrations of the unharmonic vibrations cannot be expressed in integer proportions.

Figure 4A:
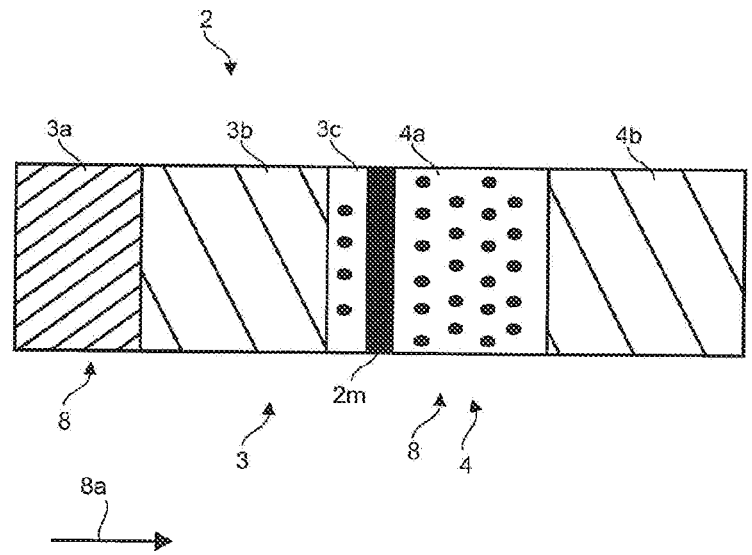
FIG. 4a-c show various embodiments of the display device.
Figure 4B:
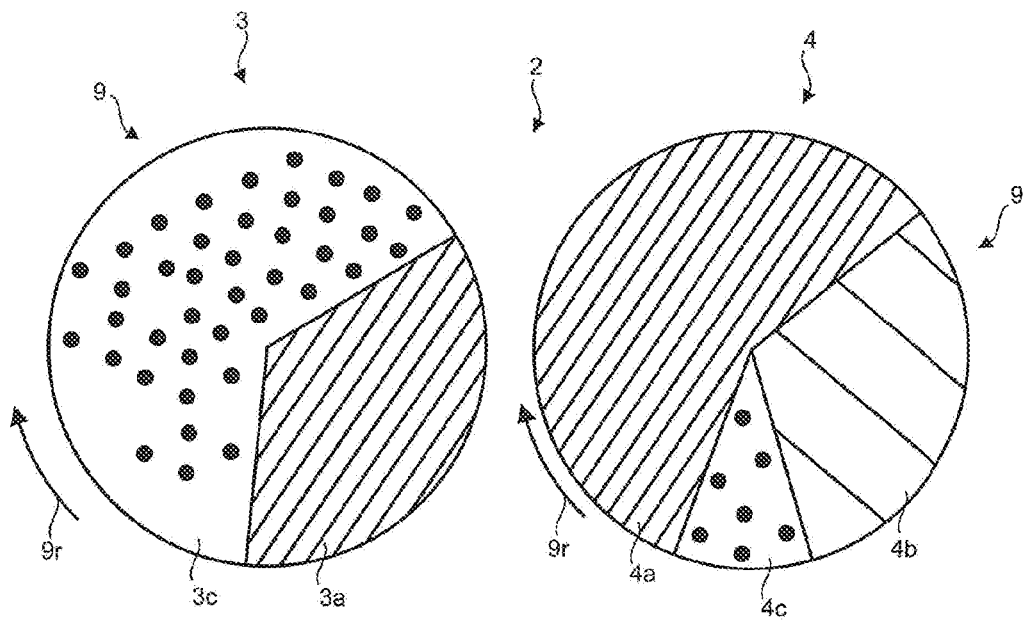
Figure 4C:
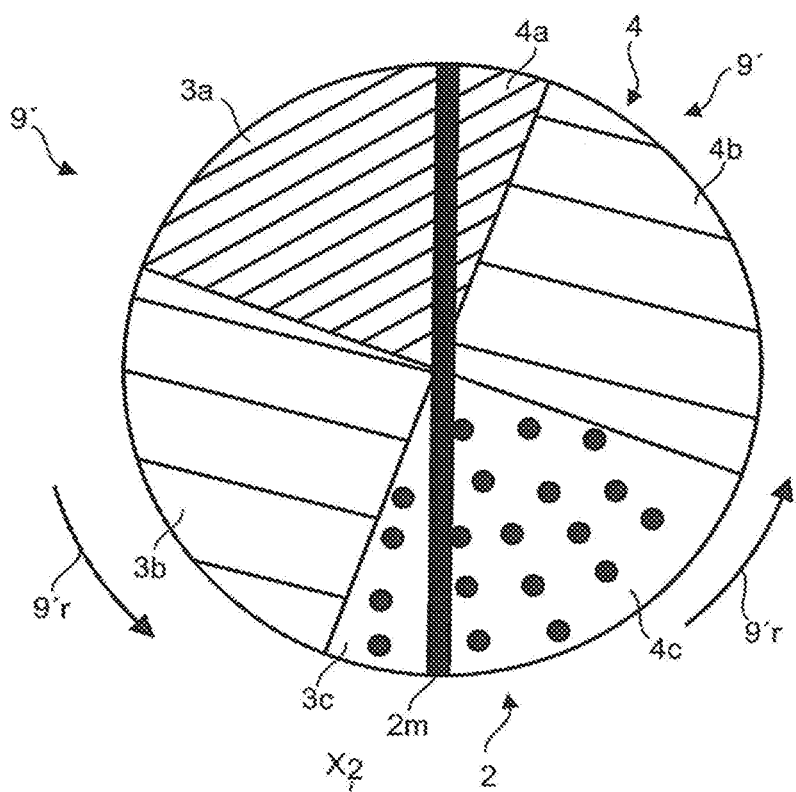

FIGS. 4a to 4c show three examples of the display device 2 with a first section 3 and a second section 4, wherein the sections 3, 4 each have a complete division into two or three segments 3a, 3b, 3c; 4a, 4b, 4c. As stated above, the number and size ratios of the three segments 3a, 3b, 3c; 4a, 4b, 4c to each other can be updated in dependence on a current value of the at least one first parameter x1, . . . , x6 or the at least one second characteristic y1, . . . , y6. Therefore, arbitrary embodiments of the size ratios are shown.

According to FIG. 4 a-c, it is shown that a first segment 3a of the first section 3 has a first pattern (having a first hatching with a first distance and a first direction), a second segment 3a of the first section 3 has a second pattern (having a second hatching with a second distance and a second direction), and a third segment 3c of the first section 3 has a third pattern (having a dot distribution). In this order, this pattern distribution also applies here to a first segment 4a of the second section 4, a second segment 4b of the second section 4, and a third segment 4c of the second section 4 (twin segments). The first, second and third patterns are visually distinct from each other.

Analogously, the visual distinctiveness could also be achieved by a different colouring of the individual segments 3a, 3b, 3c and 4a, 4b, 4c.

According to FIG. 4a, the first section 3 and the second section 4 are each designed in the form of a bar 8, which, along a longitudinal extension 8a, has a subdivision in the present case into three segments 3a, 3b, 3c, and two segments 4a, 4b. The third segment 4c of the second section 4 is currently not visible, since its current size is zero (as explained in connection with the illustration according to FIG. 3a). In this case, the two sections 3 and 4 are either arranged directly adjacent to one another or, as illustrated, separated by an optional centre bar 2m of the display device 2, wherein a third segment 3c of the first section 3 and a first segment 4a of the second section 4 are arranged respectively immediately adjacent to each other at the centre bar 2m.

FIG. 4b shows an example according to which the first section 3 and the second section 4 are each configured in the form of a circle 9. These circles 9 exhibit, along a radial direction 9r, a subdivision in the present case into two segments 3a, 3c and three segments 4a, 4b, 4c. The second segment 3b of the first section 3 is currently not visible, since its current size is zero (as explained in connection with the representation according to FIG. 3c). Both circles 9 are arranged side by side, but spaced apart from each other, so that the underlying circular surfaces are not arranged in an overlapping manner.

FIG. 4c shows an example in which the first section 3 and the second section 4 are each designed in the form of a semicircle 9'. These semicircles 9' each have a subdivision into three segments 3a, 3b, 3c and three segments 4a, 4b, 4c along a radial direction 9'r. Both semicircles 9' can be arranged directly side to side and not in an overlapping manner and can be designed so that together they form the shape of a full circle. In the present case, an optional centre bar 2m of the display device 2 which separates both half circles 9' is depicted for illustration.

It is understood that the embodiments described above are merely exemplary configurations of the system according to the invention. The configuration of the invention is therefore not limited to these embodiments.

All the features disclosed in the application documents are claimed as being essential to the invention provided that, individually or in combination, they are novel over the prior art.

LIST OF REFERENCE SIGNS 1 vehicle seat
2 display device
2m centre beam
3, 4 section
3a, 3b, 3c, 4a, 4b, 4c segment
5 upper part
6 lower part
7 vibration device
8 bar
8a longitudinal direction
9 circle
9'r semicircle
9r, 9'r, Kr radial direction
11, 12, 13, 14 signal
15 processing unit
16 memory unit
17 dividing line
21, 22, 23, 24 data
31, 32, 33 actuator
41, 42, 43 parameter
a1, a2, a1(t), a2(t), a(t) acceleration
a, b, c projection
CU control device
K virtual circular disc
K1 central axis
Q area
S system
S1, S2 sensor
U subsurface
V vehicle
x1, . . . , x6; y1, . . . , y6 characteristic
Z1, Z2, Z3 portion
Δt time interval
φ angle

What is claimed is:

1. A system for representing vibrations for a vehicle, the system comprising:
a vehicle seat with an upper part and a lower part, which are mounted movably relative to each other by a vibration device,
wherein at least one first sensor, which is adapted to detect at least one first characteristic of a first acceleration of the upper part relative to the lower part, is arranged on the upper part,
wherein at least one second sensor, which is adapted to detect at least one second parameter of a second acceleration of the lower part relative to a substrate of the vehicle, is arranged on the lower part,
wherein a display device having a first section and a second section, each exhibiting a complete division into at least two segments, and
wherein size ratios of the at least two segments to one another can be updated depending on a current value of the at least one first characteristic or the at least one second characteristic.

2. The system according to claim 1, wherein the at least one first sensor is adapted to transmit first signals, which are based on the at least one first characteristic, to a parent control device, wherein the at least one second sensor is adapted to transmit second signals, which are based on the at least one second characteristic to the parent control device, and wherein the parent control device is adapted to send third signals and fourth signals to the display device based on at least one of the first signals or the second signals.

3. The system according to claim 1, wherein the at least one first characteristic and the at least one second characteristic are selected from a group comprising: an amplitude, a frequency, a period duration, an actual value, and an average value and a summand over a defined period of the first acceleration or the second acceleration.

4. The system according to claim 1, wherein at least one of the first section or the second section are each configured in the form of a bar, which, along a longitudinal extent, exhibits a subdivision into the at least two segments.

5. The system according to claim 1, wherein at least one of the first section or the second section are designed in the form of a circle or a semicircle, which, along a radial direction, exhibits a subdivision into the at least two segments.

6. The system according to claim 1, wherein parameters of actuators of the vehicle can be adjusted by a control device, wherein by the control device, at least one of the parameters of the actuators or data that are based on at least one of first signals, second signals, third signals or fourth signals, can be transferred to a processing unit and to a memory unit.

7. The system according to claim 1, wherein a size of one of the segments of at least one of the first or the second section of the display device can be formed linearly to a size of a projection of a portion of a virtual circular disc assigned to the respective segment onto an area parallel to a central axis of the virtual circular disc.

8. The system according to claim 7, wherein a number of the portions of the virtual circular disc corresponds to a number of segments of the respective section, wherein the portions are the same size, and wherein the virtual circular disc is completely divided into the portions.

9. The system according to claim 2, wherein at least one of the first section or the second section are designed in the form of a circle or a semicircle.

10. The system according to claim 9, wherein a control device can adjust parameters of actuators of the vehicle, and wherein at least one of the parameters or data that are based on at least one of the first signals, the second signals, the third signals, or the fourth signals can be transferred to a processing unit and to a memory unit.

11. The system according to claim 9, wherein a size of one of the segments of at least one of the first or the second section of the display device can be formed linearly to a size of a projection of a portion of a virtual circular disc assigned to the respective segment onto an area parallel to a central axis of the virtual circular disc.

12. The system according to claim 2, wherein at least one of the first section or the second section is each configured in the form of a bar that divides the first section or the second section into the at least two segments.

13. The system according to claim 12, wherein a control device can adjust parameters of actuators of the vehicle, and wherein at least one of the parameters or data that are based on at least one of the first signals, the second signals, the third signals, or the fourth signals can be transferred to a processing unit and to a memory unit.

14. The system according to claim 2, wherein the at least one first characteristic and the at least one second characteristic are selected from a group comprising: an amplitude, a frequency, a period duration, an actual value, and an average value and a summand over a defined period of the first acceleration or the second acceleration.

15. The system according to claim 14, wherein at least one of the first section or the second section is each configured in the form of a bar that divides the first section or the second section into the at least two segments.

16. The system according to claim 14, wherein at least one of the first section or the second section are designed in the form of a circle or a semicircle.

17. The system according to claim 14, wherein a control device can adjust parameters of actuators of the vehicle, and wherein at least one of the parameters or data that are based on at least one of the first signals, the second signals, the third signals, or the fourth signals can be transferred to a processing unit and to a memory unit.

18. The system according to claim 3, wherein at least one of the first section or the second section is each configured in the form of a bar that divides the first section or the second section into the at least two segments.

19. The system according to claim 3, wherein at least one of the first section or the second section are designed in the form of a circle or a semicircle.

20. The system according to claim 3, wherein a control device can adjust parameters of actuators of the vehicle, and wherein at least one of the parameters or data that are based on at least one of first signals, second signals, third signals, or fourth signals can be transferred to a processing unit and to a memory unit.

* * * * *